Dec. 7, 1965  C. K. BROWN ETAL  3,221,515
GEAR TYPE IMPULSE TOOL
Original Filed Dec. 12, 1962  6 Sheets-Sheet 1
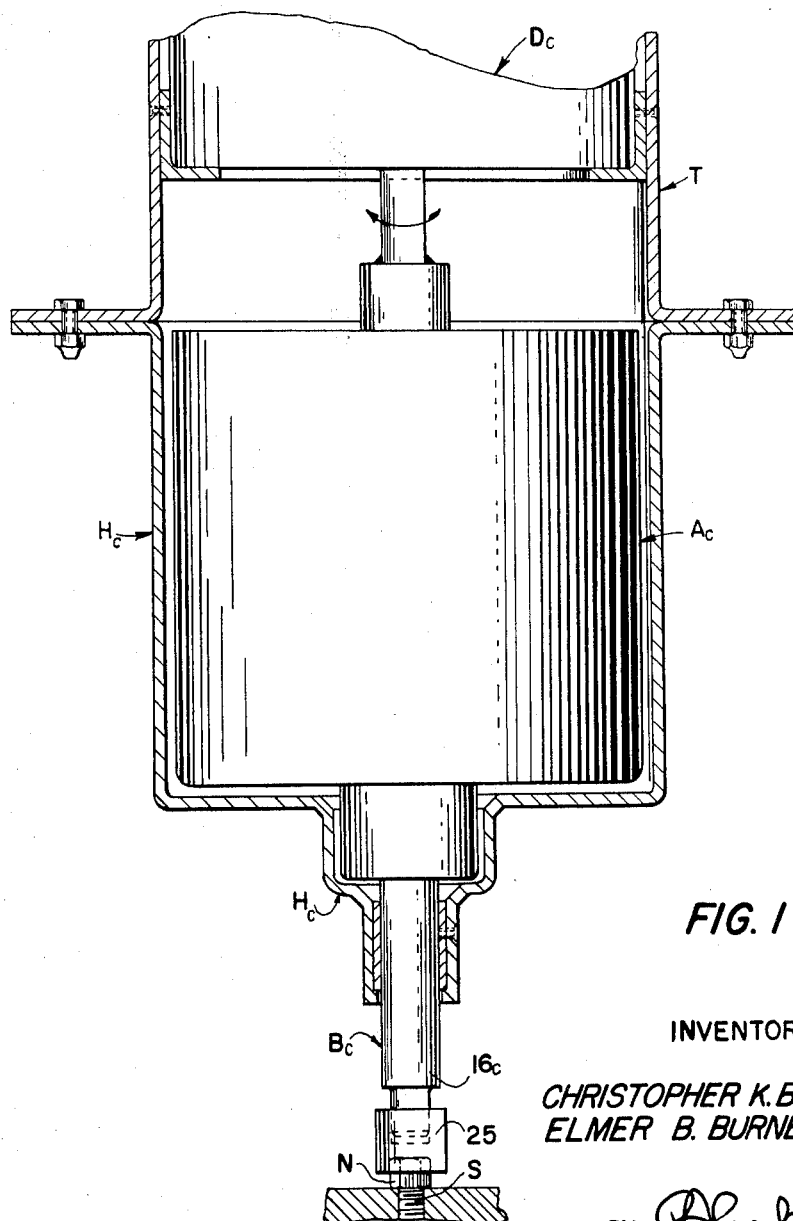
FIG. 1
INVENTORS
CHRISTOPHER K. BROWN
ELMER B. BURNETT
BY 
ATTORNEY

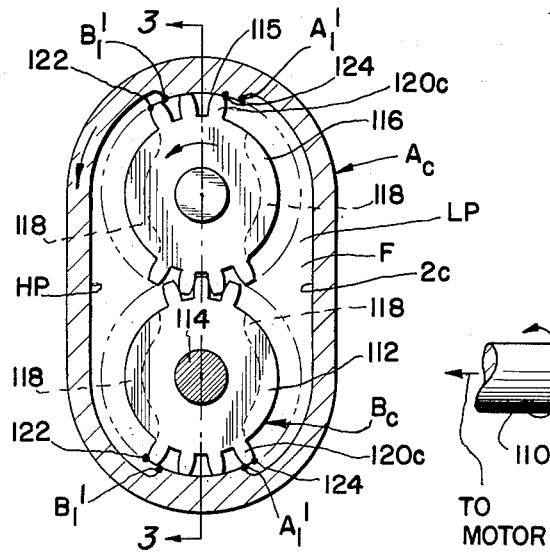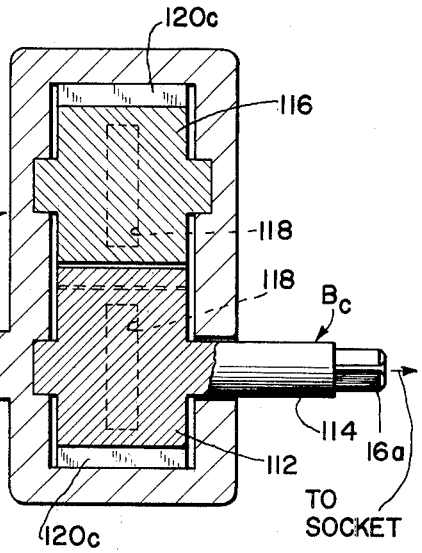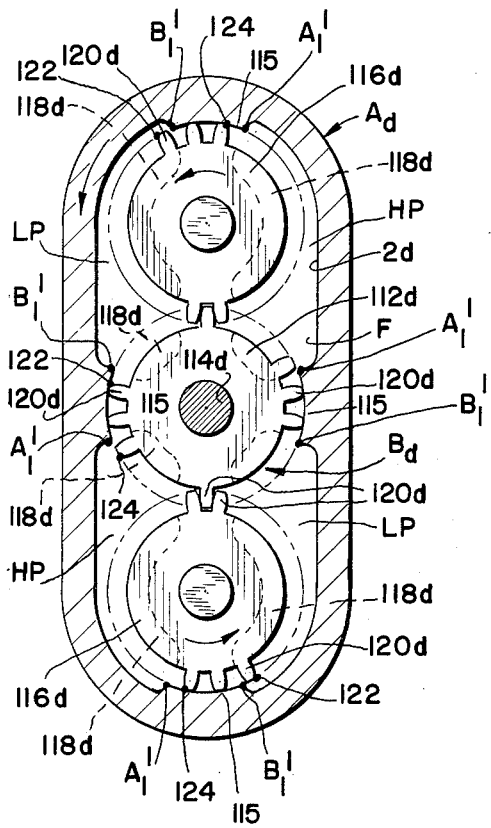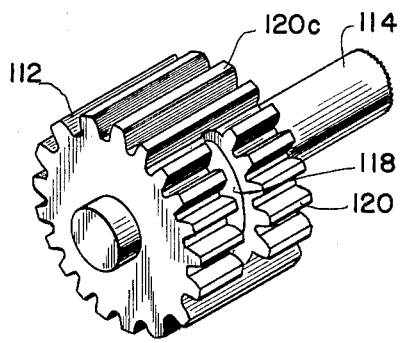

Dec. 7, 1965  C. K. BROWN ETAL  3,221,515
GEAR TYPE IMPULSE TOOL
Original Filed Dec. 12, 1962  6 Sheets-Sheet 3
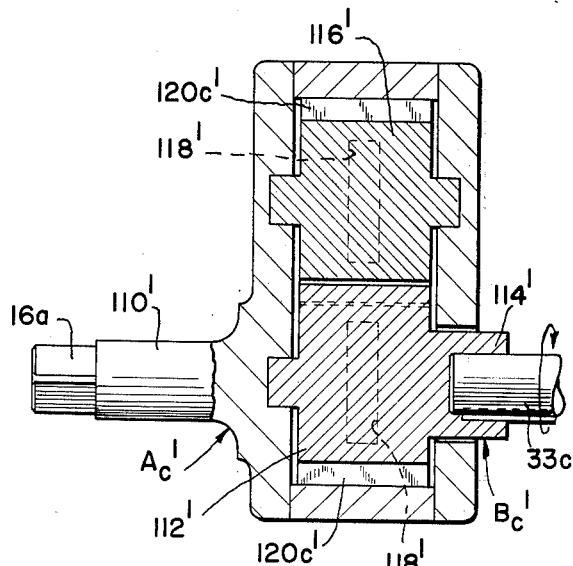
FIG. 5a
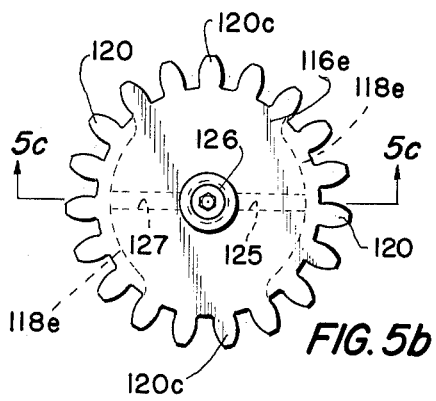
FIG. 5b
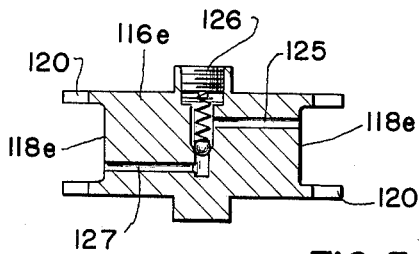
FIG. 5c
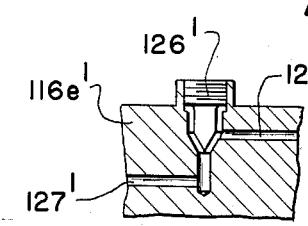
FIG. 5d
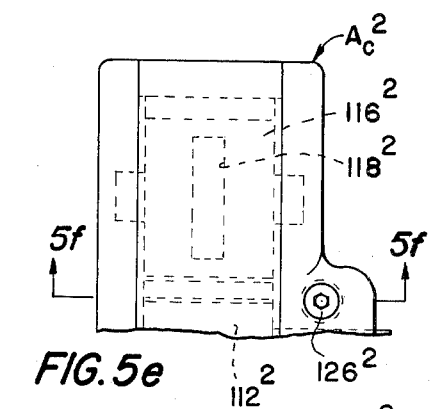
FIG. 5e
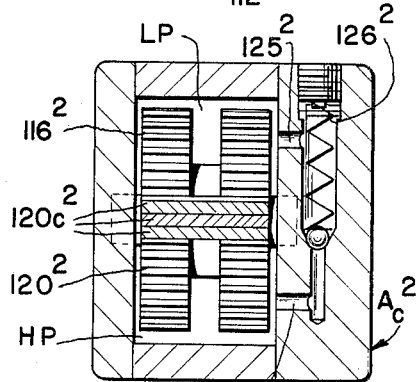
FIG. 5f
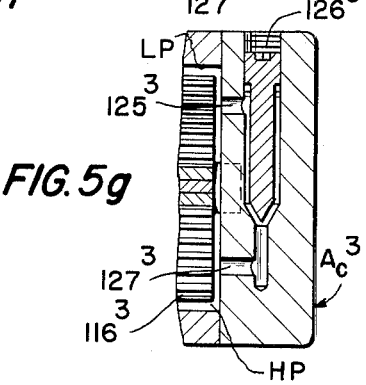
FIG. 5g
INVENTORS
CHRISTOPHER K. BROWN
ELMER B. BURNETT
BY 
ATTORNEY

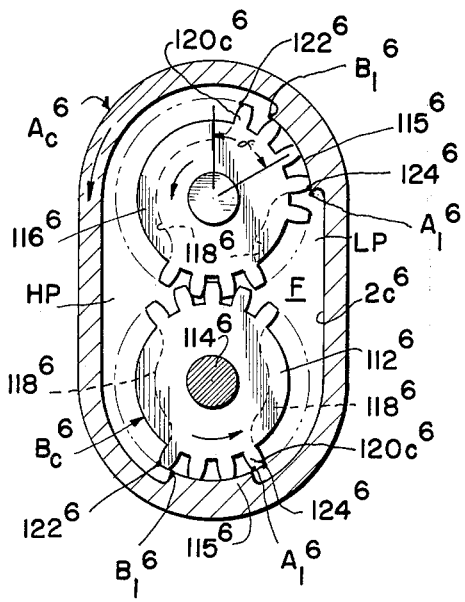
FIG. 5h
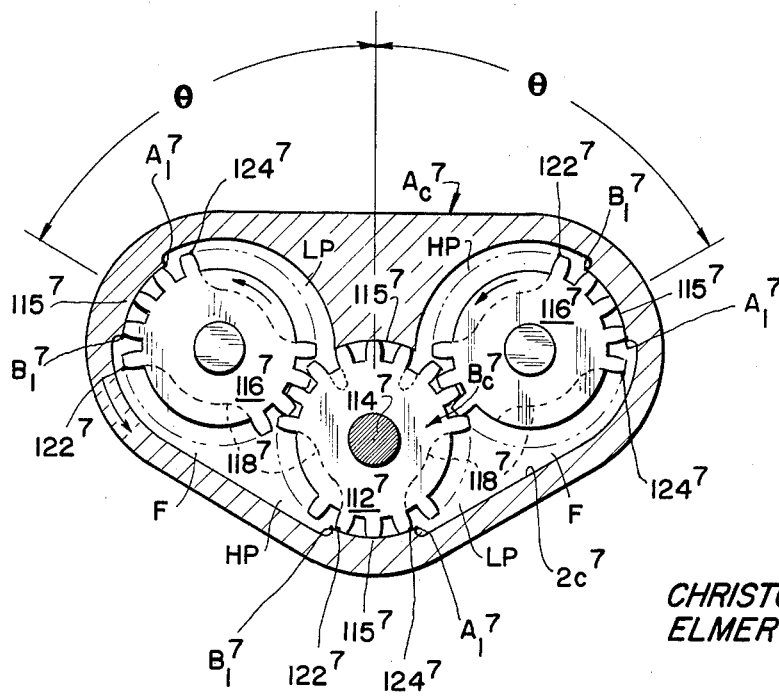
FIG. 5i
INVENTORS
*CHRISTOPHER K. BROWN*
*ELMER B. BURNETT*
BY 
ATTORNEY Dec. 7, 1965  C. K. BROWN ETAL  3,221,515
GEAR TYPE IMPULSE TOOL
Original Filed Dec. 12, 1962  6 Sheets-Sheet 6

INVENTORS
CHRISTOPHER K. BROWN
ELMER B. BURNETT

BY *[signature]*
ATTORNEY

United States Patent Office 3,221,515
Patented Dec. 7, 1965

3,221,515
GEAR TYPE IMPULSE TOOL
Christopher K. Brown, Sayre, and Elmer B. Burnett, Monroeton, Pa., assignors to Ingersoll-Rand Company, New York, N.Y., a corporation of New Jersey
Original application Dec. 12, 1962, Ser. No. 244,151. Divided and this application May 5, 1964, Ser. No. 377,788
13 Claims. (Cl. 64—26)

This application is a divisional application of U.S. patent application Serial #244,151 filed December 12, 1962 by Donald K. Skoog et al. and entitled "Impulse Tool."

The present invention relates to impulse tools of the type disclosed in U.S. Patent No. 3,116,617, issued January 7, 1964 to D. K. Skoog and U.S. patent application, Serial No. 285,160, filed March 18, 1963 by D. K. Skoog, and more particularly to an improved impulse tool of the gear type.

Heretofore, conventional portable, power operated tools for driving nuts, bolts and screws or for applying a torque to other objects have been of the stall, clutch and impact type. While the stall type and clutch type tools give satisfactory torque control in most applications, these types are larger and hence heavier than the impact type tool. Further the stall type and clutch type tools are slower in operation than the impact type tool. In addition the stall type and clutch type tools provide an undesirable torque reaction to the operator, which torque reaction is not present in a tool of the impact type.

In the impact type of tool the kinetic energy of the rotary hammer (of large mass) is transferred to the spindle (of relatively lower mass) by a collision between the jaws of the hammer and the spindle. These conventional impact tools have several limitations. First the rigid jaws of the hammer and the similar jaws of the spindle are relatively light in order to satisfy the demand of the fabricating industries for a light portable tool. However the forces between the jaws of the hammer and the jaws of the spindle are very high during the time of impact therebetween, with resultant breakage or failure of such jaws and a shorter service life than in other conventional power tools, such as those of the stall or clutch types. Secondly, with these conventional impact tools it is very difficult to control or limit the final torque on a threaded fastener to a final predetermined value within satisfactory limits of accuracy. Further the impact tools are difficult to manufacture because of their complicated structure and are rather noisy in their operation.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

A further object of the present invention is the provision of an impulse type tool which operates in a fluid at low force levels with resultant minimum wear and attendant longer service life than conventional impact tools.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the present invention is the provision of an impulse tool which provides relatively quiet operation as compared to an impact tool.

A further object of the present invention is the provision of an improved tool of the impulse type, the major elements of which tool act to seal dynamically or at high velocity and function as a valve statically or at low velocity.

A still further object of the present invention is the provision of an impulse tool which is lighter in weight and faster in operation than the tools of the stall type and clutch type.

A further object of the present invention is the provision of an impulse tool which is operable to apply a torque or a series of impulses at an angle with respect to the longitudinal axis of the impulse tool.

Still another object of the present invention is to provide a gear type impulse tool which is capable of delivering one or more impulses during each revolution of the driven means or one impulse during a plural number of revolutions of the driven means.

For a better understanding of the present invention reference should be had to the accompanying drawings, wherein like numerals of reference indicate similar parts throughout the several views and wherein:

FIG. 1 is a side elevational view of the improved tool of the impulse type, shown in engagement with a threaded fastener and with a stationary casing means shown in vertical section;

FIG. 2 is a horizontal sectional view of the gear type impulse tool showing the housing means as the driven member;

FIG. 3 is a vertical sectional view along the line 3—3 of FIG. 2;

FIG. 4 is a perspective of the spindle gear shown in FIGS. 2, 3, such spindle gear being representative of the idler gear shown in FIGS. 2, 3;

FIG. 5 is a horizontal sectional view of an impulse tool having two idler gears;

FIG. 5a is a view similar to FIG. 1 showing the spindle means as the driven member;

FIG. 5b is a plan view of an alternative embodiment of the idler gear provided with torque control means;

FIG. 5c is a vertical sectional view along the line 5c—5c of FIG. 5b in the direction of the arrows;

FIG. 5d is a fragmentary view similar to FIG. 5c of an alternative embodiment;

FIG. 5e is a fragmentary view similar to FIG. 3 showing pressure relief means in the housing;

FIG. 5f is a vertical sectional view along the line 5f—5f of FIG. 5e in the direction of the arrows;

FIG. 5g is a fragmentary view similar to FIG. 5f of an alternative embodiment;

FIG. 5h is a view similar to FIG. 2 showing the lugs on the housing means angularly disposed with respect to the longitudinal axis of the tool to obtain one impulse per revolution and utilizing gears having the same number of teeth;

FIG. 5i is a view similar to FIGS. 2, 3, and 5h showing the external idler gears disposed at an angle with respect to the center spindle gear to provide one impulse per revolution and utilizing gears having the same number of teeth;

Figure 6:
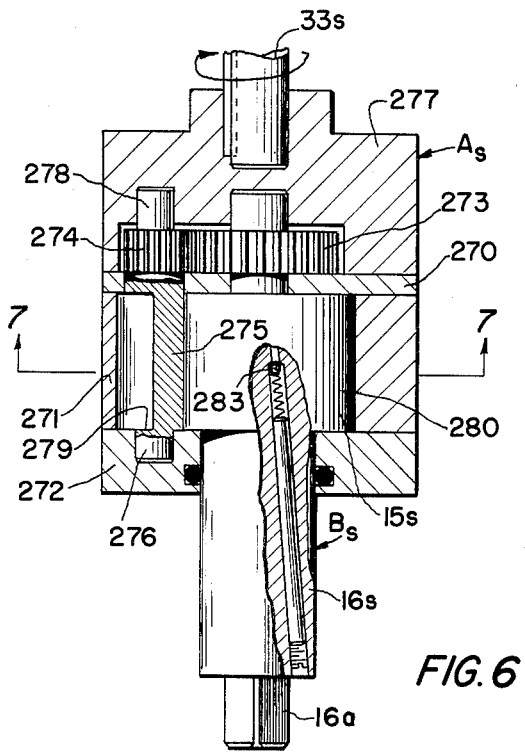
FIG. 6 is a longitudinal sectional view of the gear type impulse tool showing pressure relief means in the spindle means.

The aforesaid objects of the present invention and other objects which will become apparent as the description proceeds are achieved by providing an impulse tool for applying a predetermined torque to an object. This impulse tool comprises housing means provided with a cavity adapted to contain a fluid and a first and second sealing portion, a spindle means rotatable in the housing means and in the fluid, and drive means connected to one of the housing means and spindle means for rotating the other of the housing means and spindle means with respect to the object. A first gear means is on the housing means in the cavity and is provided with a first and second spaced solid tooth means. A second gear means is on the spindle means in the cavity, is provided with a third and fourth spaced solid tooth portions and meshes with the first gear means. Each of the first and second gear means is provided with bypass means between the solid toothed portions. The first solid tooth portion and the third solid tooth portion, the second solid tooth portion and the first sealing portion, and the fourth solid tooth portion and the second sealing portion are operable during a relatively small portion of each revolution of the relative rotary movement to seal off the cavity into a high pressure portion and to impulse the other and the object.

The gear type impulse tool has first gear means on the housing means and second gear means on the spindle means, each of the first and second gear means being provided with by-pass means.

The gear type impulse tool of the present invention has toothed blade means journaled in the driven member (either the housing means or the spindle means) and rides around on toothed sealing means carried by the other element or normally stationary element. The impulse is applied to the toothed sealing means.

While the impulse tool of the present invention may be advantageously employed for applying a torque to objects and as a source of fluid impulses in general, the impulse tool of the present invention is particularly adapted for use in conjunction with applying a torque to a threaded fastener and hence it has been so illustrated and will be so described.

With specific reference to the form of the present invention illustrated in the drawings, and referring particularly to FIG. 1, the impulse tool of the present invention (for applying a torque to a nut N on a bolt S by a socket 25) is indicated generally by the reference letter T.

As shown in FIG. 1 this impulse tool T has a housing means $A_c$ adapted to contain a fluid, such as oil F.

In this embodiment a first gear means, such as an idler gear 116 (FIGS. 2, 3,), is disposed on the housing means $A_c$. A second gear means, such as the spindle gear 112 (FIGS. 2, 3, 4), is carried by the spindle means $B_c$ and meshes with the idler gear 116. Each of the spindle gear 112 and idler gear 116 are provided with by-pass means, such as the by-pass slots 118 (FIGS. 2, 3, 4).

Oil F is contained within a cavity 2c (FIG. 2) in the housing means $A_c$ which is driven by an integral shaft 110 (FIG. 3) connected to an air motor ($D_c$ FIG. 1). The spindle means $B_c$ in this case is the spindle gear 112 rotatably mounted in the housing means $A_c$ and connected by a spindle shaft 114 (FIGS. 3, 4) to the socket (25 FIG. 1). The idler gear 116 meshes with the spindle gear 112.

As shown in FIG. 4 the spindle gear 112 and idler gear 116 are each provided with a pair of opposed by-pass slots 118 (FIGS. 2, 3, 4) with solid teeth 120c (FIGS. 2, 3, 4) disposed therebetween. Teeth 120 (FIG. 4) adjacent the by-pass slots 118 complete the toothed periphery of the spindle gear 112 and idler gear 116.

Referring to FIG. 2 as the idler gear 116 rides on the effectively stationary spindle gear 112, teeth 120 on both idler gear 116 and spindle gear 112 mesh with each other. When the spindle gear 112 and idler gear 116 are in the position shown in FIGS. 2, 3 teeth 120c (disposed between the by-pass slots 118) seal off the housing means $A_c$ and the cavity 2c (FIG. 2) into a high pressure section HP and a low pressure section LP. This sealing off occurs when the leading edge 122 of solid teeth 120c are at points $A_1^1$ on the lug 115 (FIG. 2) on the housing means $A_c$ and continues until the trailing edges 124 (FIG. 2) reach points $B_1^1$. Compression of the oil F occurs in the high pressure section HP to provide an impulse or kick to the spindle gear 112 and hence the spindle shaft 114.

When the trailing edges 124 pass points $B_1^1$ the oil F (by means of the by-pass slots 118) is allowed to pass between the high pressure section HP and the low pressure section LP.

If the spindle gear 112 and idler gear 116 have the same number of teeth, 2 impulses/revolution of the housing means $A_c$ are achieved. By various combinations of the number of gear teeth 120, 120c on the spindle gear 112 and idler gear 116 various number of revolutions of the housing means $A_c$ to provide one impulse can be utilized. For example, if the gear ratio is defined as the ratio of the number of teeth on the spindle gear 112 to the number of teeth on the idler gear 116, a gear ratio of 3 to 2 will result in one impulse for each revolution of housing $A_c$; a gear ratio of 2 to 3 will result in one impulse for each 1½ revolutions of housing $A_c$.

Alternatively, as shown in FIG. 5, a multiplicity of two idler gears 116 can be utilized to obtain the same results as shown in the previous case. This impulse tool has oil F, housing means $A_d$, drive shaft 110d, spindle means $B_d$, and spindle shaft 114d as described above. The spindle gear 112d now has four sets of solid teeth 120d and four by-pass slots 118d, and the two idler gears 116d each of which idler gear 116d has, as before, a minimum of two sets of solid teeth 120d and two sets of by-pass slots 118d. Solid sections 120d engage the housing means $A_d$ to seal off cavity 2d into two high pressure sections HP and two low pressure sections LP. The operation and function of parts is similar to the above description.

Other combinations utilizing three or more idler gears 116 can be used. The gear ratio shown in FIG. 5 is 1:1 and 2 blows/revolution will result. Other gear ratios of idler gear 116 and spindle gear 112, plus various numbers of by-pass slots 118 and solid teeth 120 can be used to give more or fewer blows/revolution.

Referring to FIG. 5a it will be noted that the spindle means $B_c^1$ can be driven by a drive means, such as an air motor similar to $D_c$ FIG. 1 and the housing means $A_c^1$ connected to the fastener similar to nut N FIG. 1 to receive and to impart the impulse thereto.

In order to provide the impulse tool with torque control means, the idler gear 116e, (FIGS. 5b, 5c) is provided with a low pressure passage 125 communicable through torque control means or pressure relief means, such as an adjustable spring loaded poppet valve 126 with a high pressure passage 127. At maximum desired torque the poppet valve 126 opens, thereby precluding any further increases in the fluid pressure in the high pressure portion HP and any attendant increase in torque.

Alternatively, as shown in FIG. 5d, an adjustable needle valve $126^1$ may be employed to provide an adjustable leakage path between the high pressure portion HP and low pressure portion LP to control maximum torque on the fastener similar to nut N FIG. 1.

Alternatively, as shown in FIGS. 5e, 5f, 5g, the pressure relief means may be contained within the housing means $A_c^2$, $A_c^3$. In FIGS. 5e and 5f an adjustable spring loaded poppet valve $126^2$ is employed while in FIG. 5g an adjustable needle valve $126^3$ is utilized as the torque control means.

In FIG. 5h; one or both of the lugs $115^6$ on the housing means $A_c^6$ are disposed at an angle and with respect to the longitudinal axis of the tool and the by-pass slots $118^6$ are of unequal length to permit the use of spindle gear $112^6$ and idler gear $116^6$ having the same number of teeth to provide one impulse per revolution of the housing means $A_c^6$.

In FIG. 5i the external idler gears $116^7$ are disposed at angles $\theta_1$ and $\theta_2$ with respect to the center spindle gear $112^7$ to permit the use of gears $116^7$ and $112^7$ having the same number of teeth to provide one impulse per revolution of the housing means $A_d^7$.

FIGURES 6, 7, 7a–7e

Figure 7E:
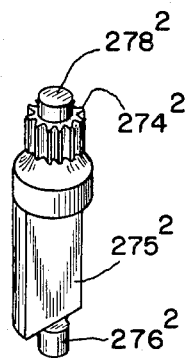
FIG. 7e is a perspective of the toothed blade employed in the device shown in FIGS. 7c, 7d.
Figure 7:
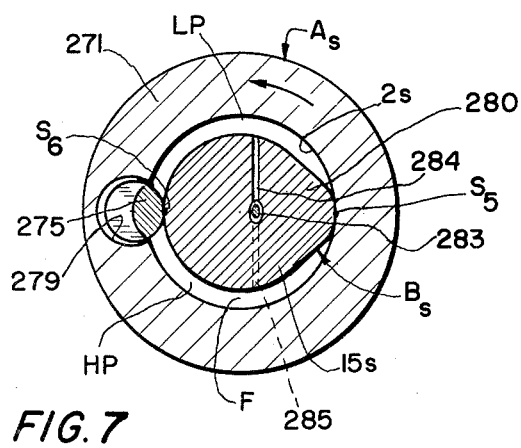
FIG. 7 is a vertical sectional view along the line 7—7 of FIG. 6 in the direction of the arrows.

In FIGURES 6, 7 toothed blade means, such as the toothed blade 275 (FIGS. 6, 7) is journaled in the driven element (either the housing means $A_s$ or the spindle means $B_s$ in this case the housing means $A_s$) and rides around on a toothed sealing means, such as the spindle sealing member 280 (FIGS. 6, 7), carried by the other element or normally stationary element in this case the spindle means $B_s$. The toothed blade 275 seals off the high pressure section HP of cavity $2_s$ (FIG. 7) thus applying an impulse to the spindle sealing member 280.

The housing means $A_s$, suitably an inner housing, comprises rear end plate 270 (FIG. 6), cylinder 271 (FIGS. 6, 7), front end plate 272 (FIG. 6). The spindle $15_s$ (FIGS. 6, 7) carries the spindle sealing member 280 and a spindle gear 273 (FIG. 6) which gear 273 meshes with gear teeth 274 (FIG. 6) on a blade 275 (FIGS. 6, 7) journaled in the front end plate 272 at 276 (FIG. 6) and in a gear cage 277 (FIG. 6) at 278 (FIG. 6). This toothed blade 275 is provided with a relief slot 279 (FIGS. 6, 7). The spindle means $B_s$ is provided with pressure relief means, such as an adjustable poppet valve 283 (FIGS. 6, 7) connected by passages 284, 285 (FIG. 7) to the low pressure portion LP and high pressure portion HP of the cavity $2s$ (FIG. 7) to provide torque control means.

It will be understood that the spindle sealing member 280 can be contoured to any desired cross sectional configuration such as circular, rectangular, etc.

As the inner housing $A_s$ rotates clockwise (FIGURE 7) the spindle gear 273 is held stationary by the resistance of the fastener N FIG. 1. As a result, the toothed blade 275 (carried by the rotating inner housing $A_s$) rotates on the spindle gear 273 in clockwise direction.

Depending on the gear ratio between the gear teeth 274 on toothed blade 275 and the spindle gear 273, an impulse is imparted to the spindle sealing member 280 every time the blade 275 assumes the position shown in FIGURE 7 and the cavity $2s$ is divided by seal points $S_5$ and $S_6$ into a high pressure portion HP and a low pressure portion LP. Obviously when the relief slot 279 is in communication with the cavity $2s$ (i.e., the toothed blade 275 is rotated 180° from the position shown in FIGURE 7) the pressure in high pressure portion HP is relieved.

Multiple impulses during each revolution of the inner housing $A_s$ can be obtained by using a plurality of toothed blades 275.

Figure 7A:
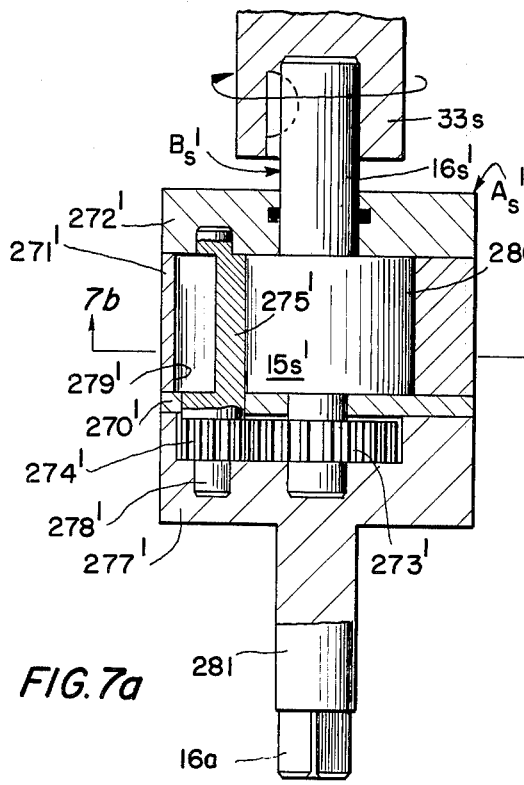
FIG. 7a is a view similar to FIG. 6 showing the spindle means as the driven member and the housing means connected to the square drive for a fastener socket.
Figure 7C:
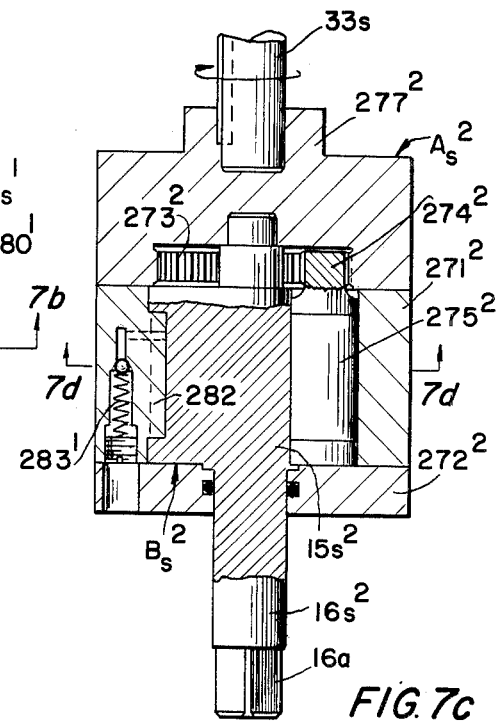
FIG. 7c is a view similar to FIGS. 6, 7a, showing the housing means connected to the drive means and with the toothed blade disposed in the spindle means and driven by an internal gear carried by the housing means, and showing pressure relief means in the housing means.
Figure 7B:
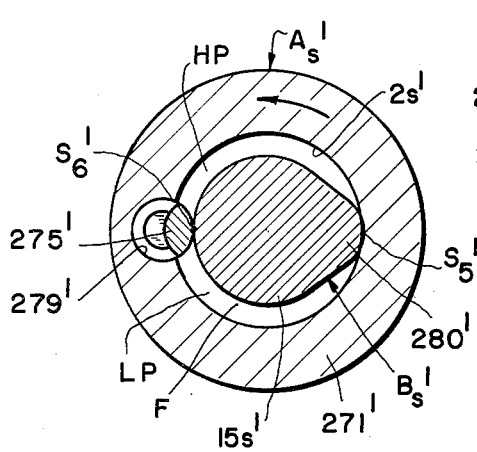
FIG. 7b is a horizontal sectional view along the line 7b—7b of FIG. 7a in the direction of the arrows.

As shown in FIGS. 7a, 7b the shaft $16_s$ of the spindle means $B_s^1$ is driven by an output shaft $33s$ of a drive means, such as an air motor $D_s$ FIG. 1. The shaft 281 of the housing means $A_s^1$ carries a square drive $16a$ for a fastener socket 25 FIG. 1.

Figure 7D:
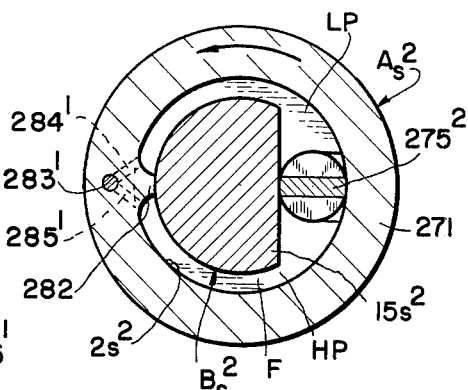
FIG. 7d is a horizontal sectional view along the line 7d—7d of FIG. 7c in the direction of the arrows.

In FIGS. 7c, 7d the housing means $A_s^2$ is connected to the output shaft of a drive means, such as an air motor similar to motor $D_s$ FIG. 1. The toothed blade $275^2$ (FIG. 7e) is carried by the spindle means $B_s^2$ and driven by an internal gear $273^2$ carried by the housing means $A_s^2$ (i.e., gear cage $277^2$). It will be noted from FIG. 7e that the toothed blade $275^2$ has a reduced center portion to permit passage thereby of a sealing lug 282 carried by the housing means $A_s^2$. Pressure relief means, such as an adjustable spring loaded poppet valve $283^1$ is disposed in the housing means $A_s^2$ to provide torque control and cut-off of the tool at a maximum predetermined torque. Passages $284^1$, $285^1$ connect the poppet valve $283^1$ to the low pressure portion LP and high pressure portion HP of the cavity $2s^2$ respectively.

It will be recognized by those skilled in the art that the objects of the present invention have been achieved by the provision of an impulse tool which applies a force, namely oil pressure, on the spindle blade and spindle for a short time (namely during the dynamic sealing portion of the operating cycle of the impulse tool) thus providing operation in a fluid at low force levels with resultant minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition, the impulse tool provides relatively quiet operation as compared with conventional impact tools. The impulse tool acts as a seal dynamically and as a valve statically; has all of the advantages of the stall type, clutch type and impact type tools and none of the disadvantages thereof; is lighter in weight and faster in operation than the tools of the stall type and clutch type.

A gear type impulse tool is provided which is capable of delivering one or more impulses during each revolution of the driven means or one impulse during a plural number of revolutions of the driven means.

Again a gear type impulse tool has been provided which is capable of producing multiple impulses during each revolution of the driven member.

While in accordance with the patent statutes one best known embodiment of and alternative embodiment of the present invention has been illustrated and described in detail, it is to be particularly understood that the invention is not limited thereto or thereby.

We claim:
1. An impulse tool for applying a torque to an object, said impulse tool comprising:
 (a) housing means provided with a cavity for sealingly containing a fluid and provided with first and second sealing portions,
 (b) spindle means in said housing means and in said fluid,
 (c) drive means operatively associated with one of said housing means and said spindle means for causing relative rotary movement between said housing means and said spindle means,
 (d) the other of said housing means and said spindle means being adapted to engage said object,
 (e) first gear means on said housing means in said cavity and provided with first and second spaced solid tooth portions,
 (f) second gear means on said spindle means in said cavity and provided with third and fourth spaced solid tooth portions and meshing with said first gear means, each of said first and second gear means being provided with by-pass means between said solid toothed portions,
 (g) said first solid tooth portion and said third solid tooth portion, said second solid tooth portion and said first sealing portion and said fourth solid tooth portion and said second sealing portion being disposed in sealing relation during a relatively small portion of each revolution of said relative rotary movement,
 (h) said first solid tooth portion and said third solid tooth portion, said second solid tooth portion and said first sealing portion, and said fourth solid tooth portion and said second sealing portion being operable during said relatively small portion of each revolution of said relative rotary movement to dynamically seal off a portion of said cavity into a high pressure portion so that the pressure in said high pressure portion of the fluid and on said other increases thereby causing the other of said housing means and said spindle means to rotate with respect to said one and to apply a torque to said object twice during each said revolution.

2. The impulse tool recited in claim 1 wherein said drive means is connected to said housing means.

3. The impulse tool recited in claim 1 wherein said drive means is connected to said spindle means.

4. The impulse tool recited in claim 1 wherein said housing means is provided with a third sealing portion and said second gear means is provided with an additional solid tooth portion, said third sealing portion and said additional solid tooth portion meshing during said relatively small portion in sealing relation.

5. The impulse tool recited in claim 1 wherein said first and second solid tooth portions are diametrically opposed, said third and fourth tooth portions are diametrically opposed respectively to produce two blows per revolution and said first and second sealing portions are diametrically opposed.

6. The impulse tool recited in claim 1 wherein said first and second solid tooth portions are disposed at an angle less than 180° with respect to each other and said first and second sealing portions are disposed with respect to each other at said angle.

7. An impulse tool for applying a torque to an object, said impulse tool comprising:
(a) housing means provided with a cavity for sealingly containing a fluid,
(b) spindle means in said housing means and in said fluid,
(c) drive means operatively associated with one of said housing means and said spindle means for causing relative rotary movement between said housing means and said spindle means,
(d) the other of said housing means and said spindle means being adapted to engage said object,
(e) a first gear means on said housing means,
(f) a second gear means on said spindle means and meshing with said first gear means,
(g) blade means on one of the housing means and said spindle means and connected to one of said first gear means and said second gear means and provided with relief means,
(h) sealing means carried by the other of the housing means and said spindle means and connected to the other of said first gear means and said second gear means,
(i) said blade means and said spindle means and said housing means and said sealing means and said one of said housing means and said spindle means being disposed in sealing relation during a relatively small portion of each revolution of said relative rotary movement,
(j) said blade means, said spindle means and said housing means and said sealing means and said one of said housing means and said spindle means being operable during said relatively small portion of each revolution of said relative rotary movement to dynamically seal off a portion of said cavity into a high pressure portion so that the pressure in said high pressure portion of the cavity and on said other increases thereby causing the other of said housing means and said spindle means to rotate with respect to said one and to apply a torque to said object.

8. The impulse tool recited in claim 7 wherein said drive means is connected to said housing means.

9. The impulse tool recited in claim 7 wherein said drive means is connected to said spindle means.

10. The impulse tool recited in claim 7 wherein said blade means is connected to said first gear means.

11. The impulse tool recited in claim 7 wherein said blade means is connected to said second gear means.

12. The impulse tool recited in claim 7 wherein said sealing means is on said housing means.

13. The impulse tool recited in claim 7 wherein said sealing means is on said spindle means.

References Cited by the Examiner
UNITED STATES PATENTS

| | | | |
|---|---|---|---|
| 879,045 | 2/1908 | Henderson | 192—58 |
| 1,155,314 | 9/1915 | Hungerford | 192—58 |
| 1,231,160 | 6/1917 | Hungerford | 192—58 |
| 2,743,628 | 5/1956 | Scharaffa | 192—61 X |
| 2,986,024 | 5/1961 | Power | 64—26 |
| 3,116,617 | 1/1964 | Skoog | 64—26 |

BROUGHTON G. DURHAM, *Primary Examiner.*

ROBERT C. RIORDON, *Examiner.*